(12) United States Patent
Riha et al.

(10) Patent No.: US 7,296,602 B1
(45) Date of Patent: Nov. 20, 2007

(54) TREE PROCESSING EQUIPMENT WITH TWO POSITION PIVOT POINT FOR ACTUATOR ENDS

(76) Inventors: Gary D. Riha, 1573 Sherwood Dr., Green Bay, WI (US) 54313; Donald A. Dubey, 110 Harbor Dr., Columbia, SC (US) 29229

( * ) Notice: Subject to any disclaimer, the term of this patent is extended or adjusted under 35 U.S.C. 154(b) by 0 days.

(21) Appl. No.: 11/485,765

(22) Filed: Jul. 13, 2006

(51) Int. Cl.
*A01G 23/08* (2006.01)
(52) U.S. Cl. ........................... 144/4.1; 144/34.1
(58) Field of Classification Search ............. 144/4.1, 144/34.1, 34.5
See application file for complete search history.

(56) References Cited

U.S. PATENT DOCUMENTS

| | | | |
|---|---|---|---|
| 4,800,936 A * | 1/1989 | Pomies et al. ............ | 144/4.1 |
| 4,881,582 A * | 11/1989 | Ketonen .................. | 144/4.1 |
| 5,553,993 A * | 9/1996 | Gilbert et al. ............ | 414/739 |
| 6,516,841 B1 * | 2/2003 | Oilund ..................... | 144/4.1 |
| 6,691,751 B2 * | 2/2004 | Kettunen et al. .......... | 144/4.1 |
| 6,691,752 B2 * | 2/2004 | DiSabatino ............... | 144/34.1 |
| 6,962,178 B2 | 11/2005 | Duval ....................... | 144/3.1 |

* cited by examiner

*Primary Examiner*—Shelley M. Self
(74) *Attorney, Agent, or Firm*—Donald J. Ersler (57) ABSTRACT

Tree processing equipment with two position pivot point for actuator ends includes a retention bracket, a processing head and at least one actuator. A bottom of the retention bracket is pivotally attached to the processing head. One end of the actuator is pivotally attached to the retention bracket and an actuation end is pivotally attached to the processing head. A first pivot hole and a second pivot hole are formed through the processing head or the retention bracket. A pivot pin is inserted through an actuator end and the first pivot hole for harvesting and processing in normal terrains. The pivot pin is inserted through one of the actuator ends and the second pivot hole for processing trees in mountainous terrains.

10 Claims, 13 Drawing Sheets

TREE PROCESSING EQUIPMENT WITH TWO POSITION PIVOT POINT FOR ACTUATOR ENDS

BACKGROUND OF THE INVENTION

1. Field of the Invention

The present invention relates generally to tree processing equipment and more specifically to tree processing equipment with two position pivot point for actuator ends.

2. Discussion of the Prior Art

Tree processing heads have a limited rotation angle relative to a retention bracket. In mountainous terrains, the tree processing equipment is forced to operate at extreme angles of inclination. State of the art tree processing equipment is not designed to operate at extreme angles of inclination. As a result processing trees becomes difficult, if not impossible in certain geographic areas. U.S. Pat. No. 6,962,178 to Duval discloses a tree processor. The Duval patent includes a coupling and processing head. Two pairs of apertures are formed in the processing head. The coupler is mounted to either one of the two pairs of apertures with a shaft. One end of an actuator is mounted to the coupler and the other end is mounted to one of two different mounting brackets located on the processing head. However, the two positions of the coupler relative to the processing head do not increase a rotational angle of the processing head relative to the coupler.

Accordingly, there is a clearly felt need in the art for tree processing equipment with two position pivot point for actuator ends, which allows the rotational angle of the processing head to be increased for mountainous terrains.

SUMMARY OF THE INVENTION

The present invention provides tree processing equipment with two position pivot point for actuator ends for increasing the rotational angle of a processing head. The tree processing equipment with two position pivot point for actuator ends (improved tree processor) includes a retention bracket, a processing head and at least one actuator. A bottom of a rotator is attached to a top of the retention bracket. A top of the rotator is attached to an end of a forestry equipment boom. A bottom of the retention bracket is pivotally attached to the processing head. One end of the actuator is pivotally attached to the retention bracket and the other end is pivotally attached to the processing head.

A first pivot hole and a second pivot hole are formed through the processing head. A pivot pin is inserted through an actuation end of the actuator and the first pivot hole for harvesting and processing in normal terrains or harvesting in mountainous terrains. The pivot pin is inserted through the actuation end of the actuator and the second pivot hole for increasing angular rotation of the processing head relative to the retention bracket for processing trees in mountainous terrains.

In a second embodiment of the improved tree processor, the first and second pivot holes are formed through the retention bracket and not the processing head. The pivot pin is removable from the actuation end of the actuator and the first or second pivot holes. The second pivot hole increases the angular rotation of the processing head relative to the retention bracket for processing trees in mountainous terrains.

Accordingly, it is an object of the present invention to provide an improved tree processor, which allows the rotational angle of the processing head to be increased relative to a retention bracket for mountainous terrains.

These and additional objects, advantages, features and benefits of the present invention will become apparent from the following specification.

DETAILED DESCRIPTION OF THE PREFERRED EMBODIMENTS

Figure 1:
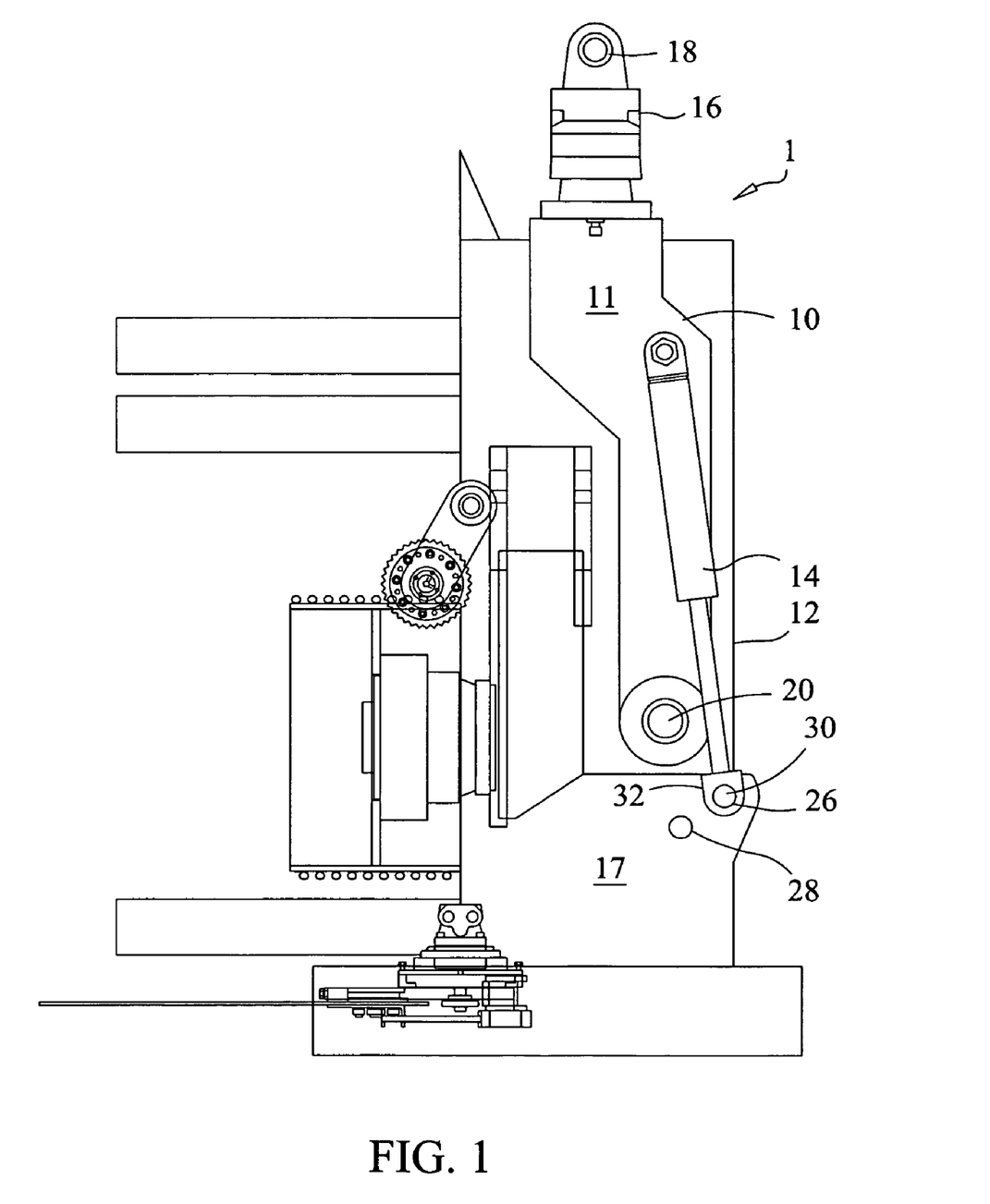
FIG. 1 is a side view of an improved tree processor with a processing head having two pivot holes, an actuation end of an actuator is pivotally retained in a first pivot hole to place the processing head at a (0) degree rotation relative to a retention bracket.

With reference now to the drawings, and particularly to FIG. 1, there is shown a side view of an improved tree processor 1. With reference to FIGS. 2-7, the improved tree processor 1 includes a retention bracket 10, a processing head 12 and an actuator 14. The retention bracket 10 includes a pair of bracket support plates 11. The processing head 12 includes a pair of pivot plates 15 and at least one actuation plate 17. Processing heads are well known in the art and need not be explained in detail. A rotator 16 is attached to a top of the retention bracket 10. The rotator 16 is pivotally retained on an end of a forestry equipment boom (not shown) by inserting a pin through the end of the forestry equipment boom and a retention bore 18. The rotator 16 allows the retention bracket 10 to be rotated relative to the forestry equipment boom.

A bottom of the pair of retention bracket support plates 11 are pivotally attached to the pair of pivot plates 15 of the processing head 12 by inserting two pins 20 through two retention bracket bores 22 and two head bores 24. One end of the actuator 14 is pivotally attached to one of the bracket support plates 11 and an actuation end 32 of the actuator 14 is pivotally attached to the actuation plate 17 of the processing head 12. However, the one end of the actuator 14 may also be pivotally attached to the actuation plate 17 and the actuation end 32 pivotally attached to one of the bracket support plates 11.

Figure 2:
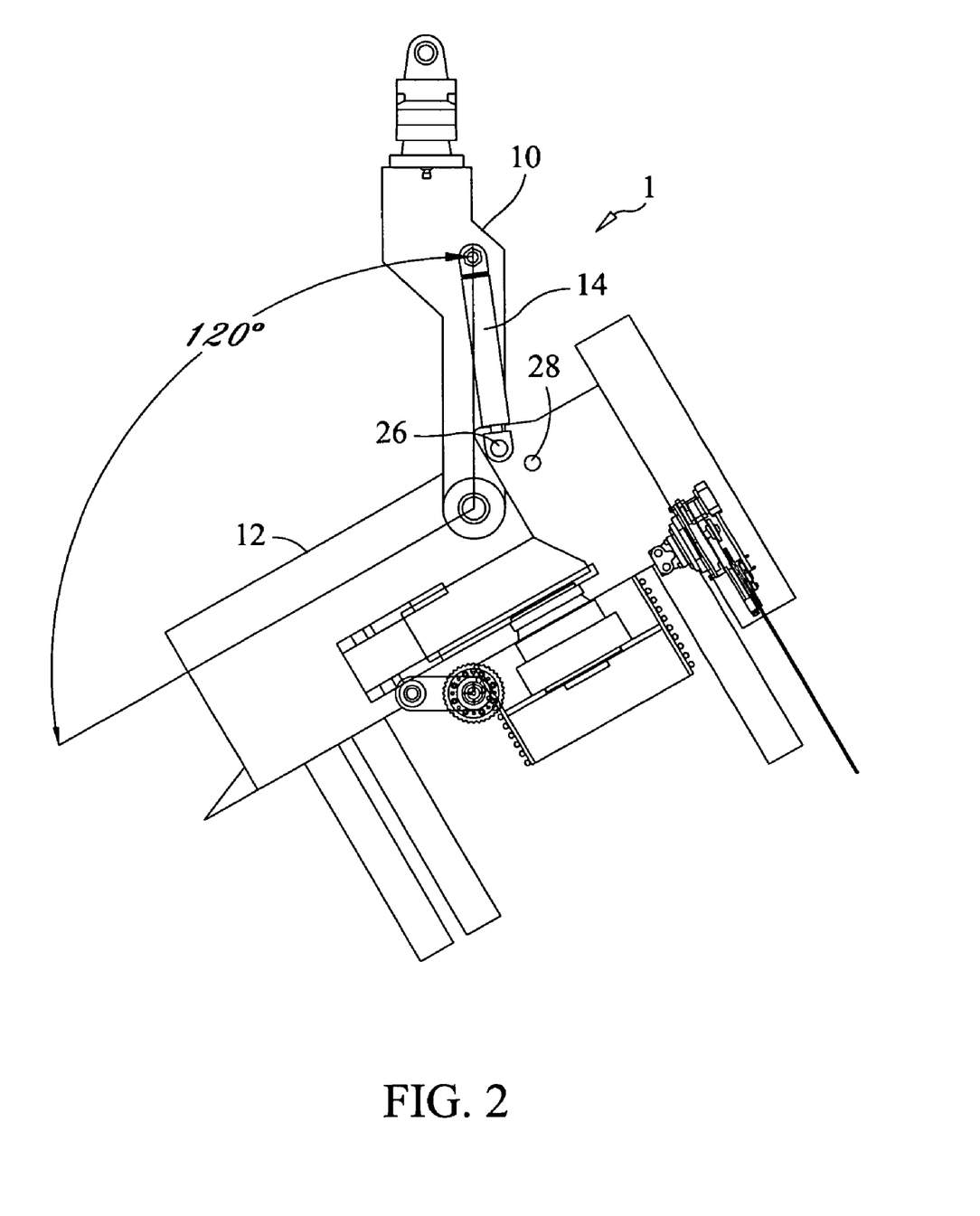
FIG. 2 is a side view of an improved tree processor with a processing head having two pivot holes, an actuation end of an actuator is pivotally retained in a first pivot hole to place the processing head at a (120) degree rotation relative to a retention bracket.
Figure 3:
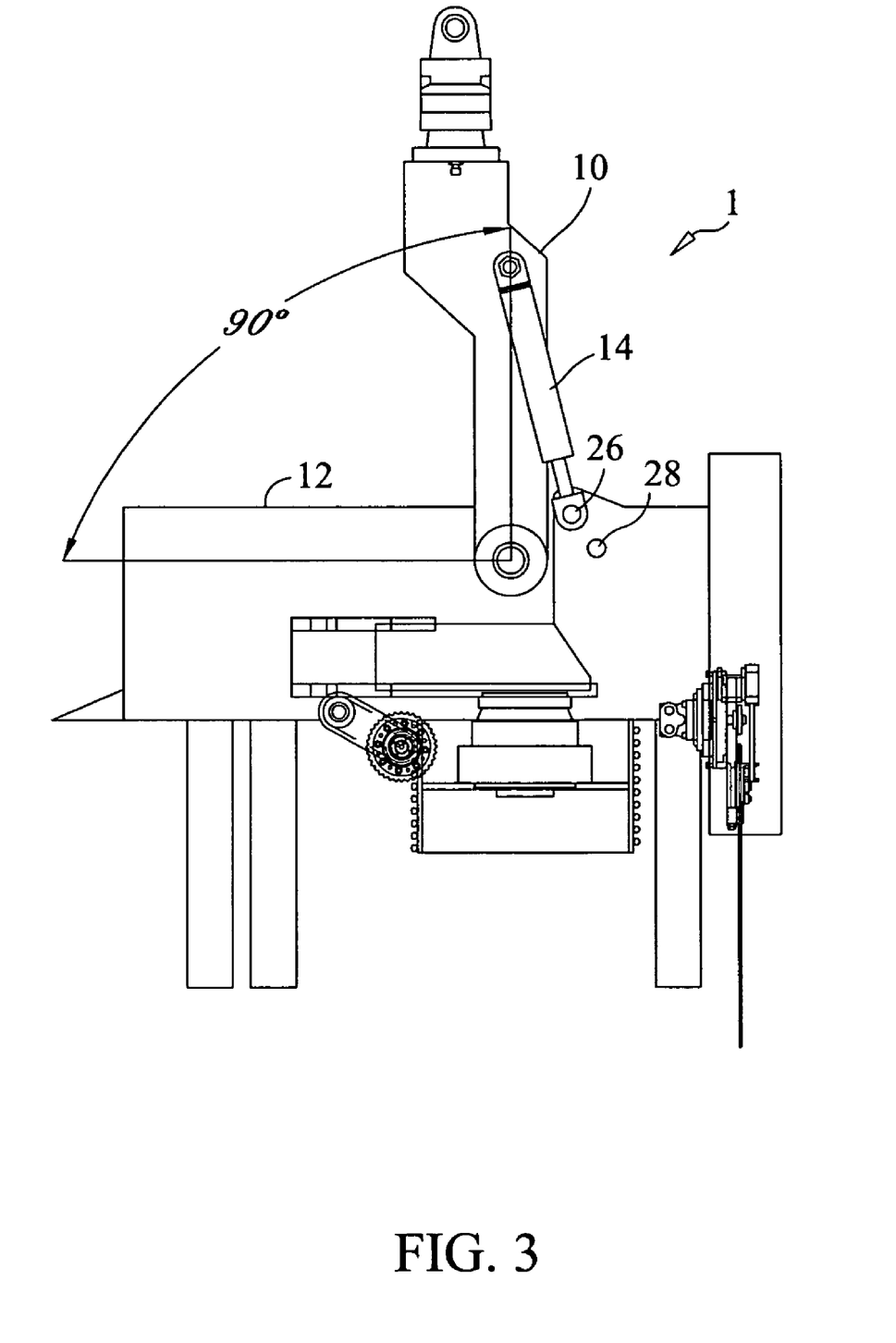
FIG. 3 is a side view of an improved tree processor with a processing head having two pivot holes, an actuation end of an actuator is pivotally retained in a first pivot hole to place the processing head at a (90) degree rotation relative to a retention bracket.
Figure 4:
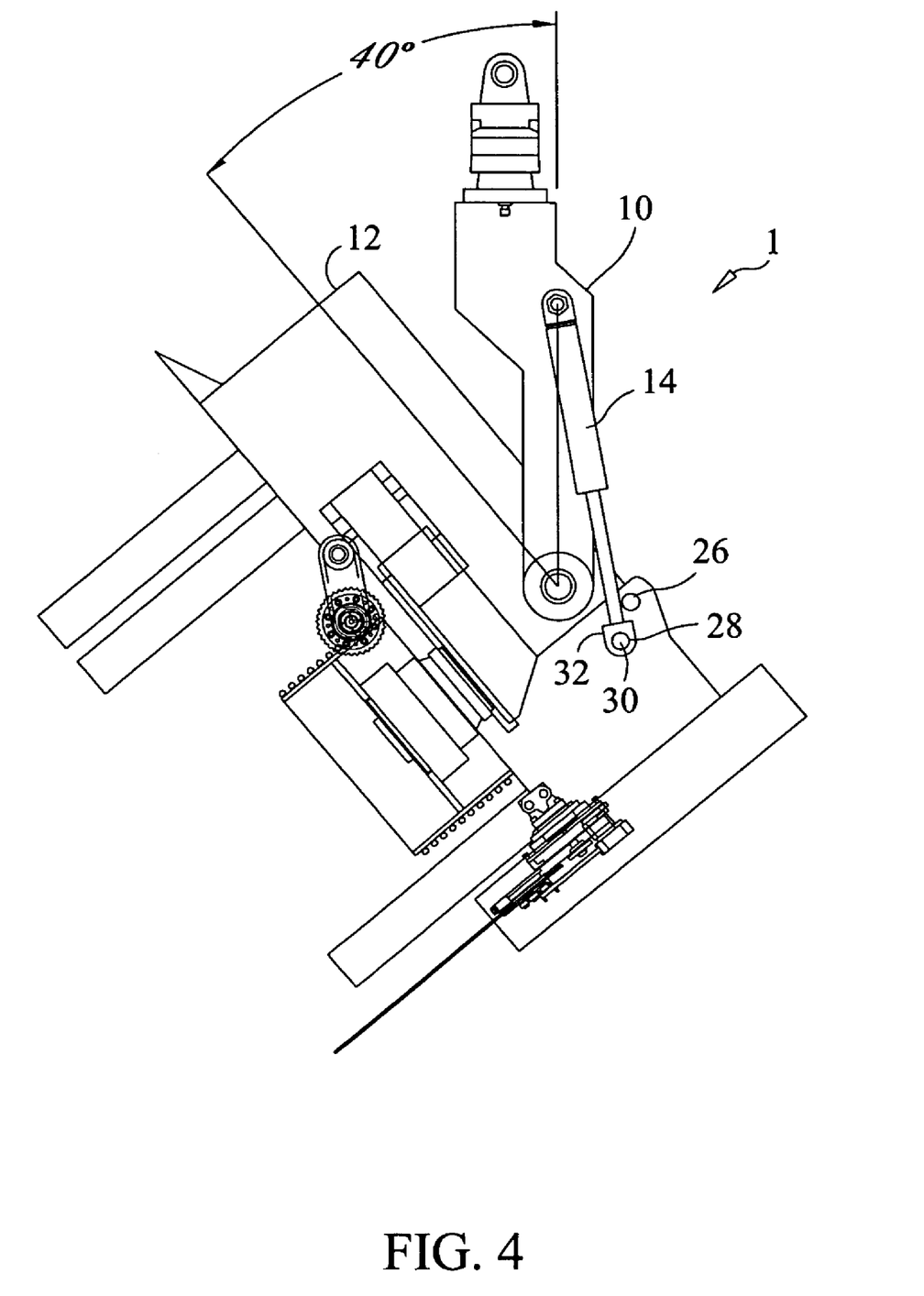
FIG. 4 is a side view of an improved tree processor with a processing head having two pivot holes, an actuation end of an actuator is pivotally retained in a second pivot hole to place the processing head at a (40) degree rotation relative to a retention bracket.
Figure 5:
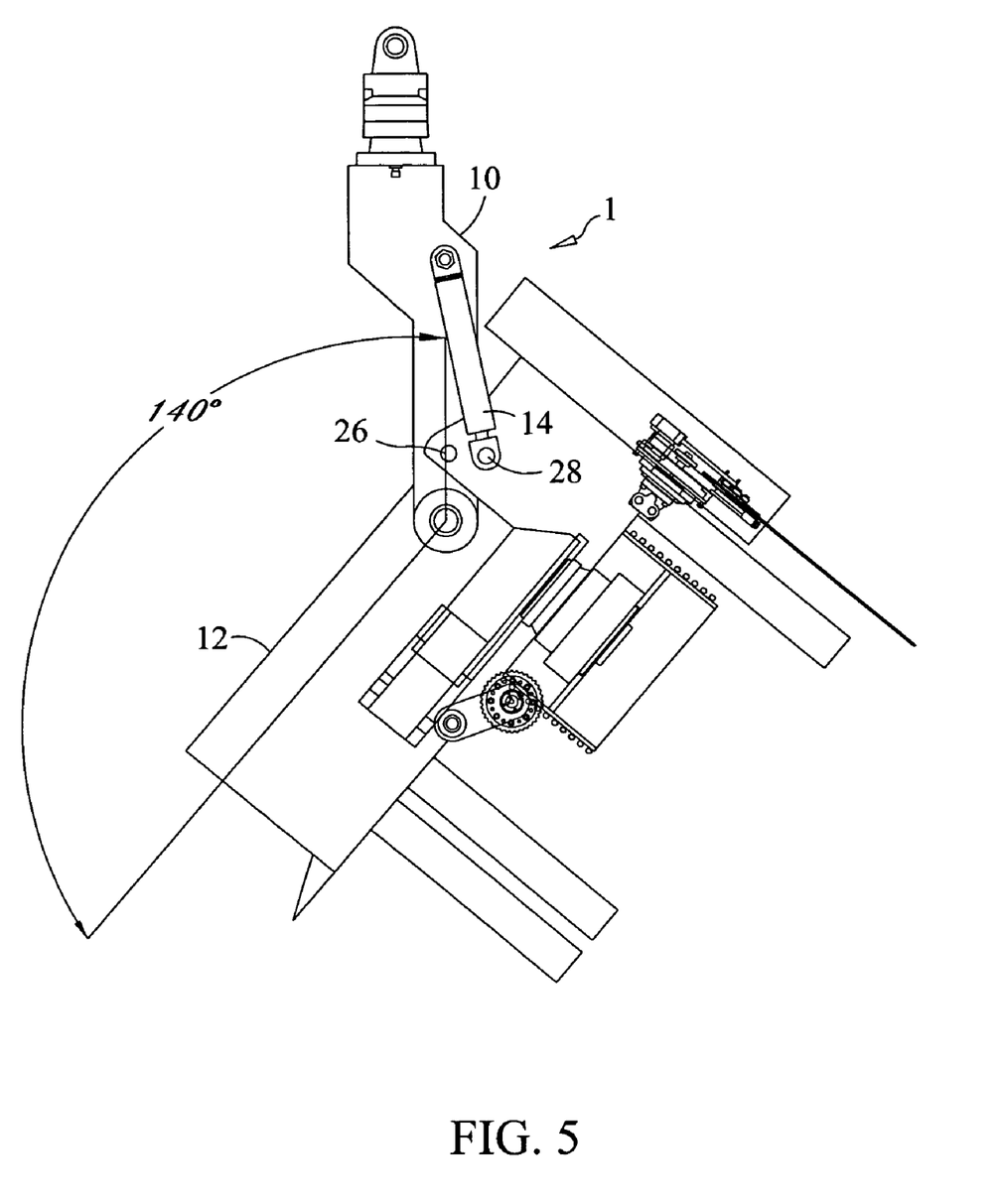
FIG. 5 is a side view of an improved tree processor with a processing head having two pivot holes, an actuation end of an actuator is pivotally retained in a second pivot hole to place the processing head at a (140) degree rotation relative to a retention bracket.
Figure 6:
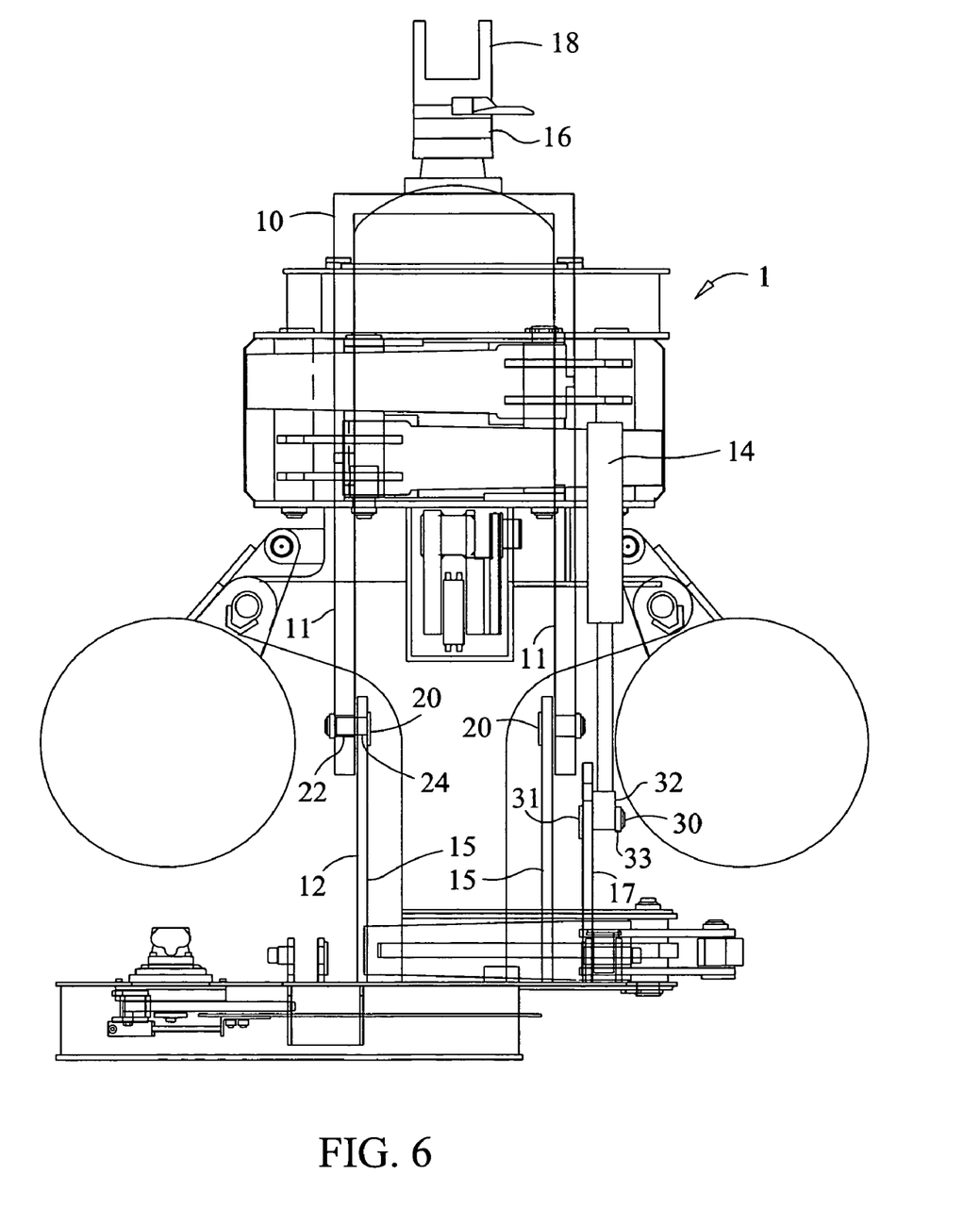
FIG. 6 is a front view of an improved tree processor.
Figure 7:
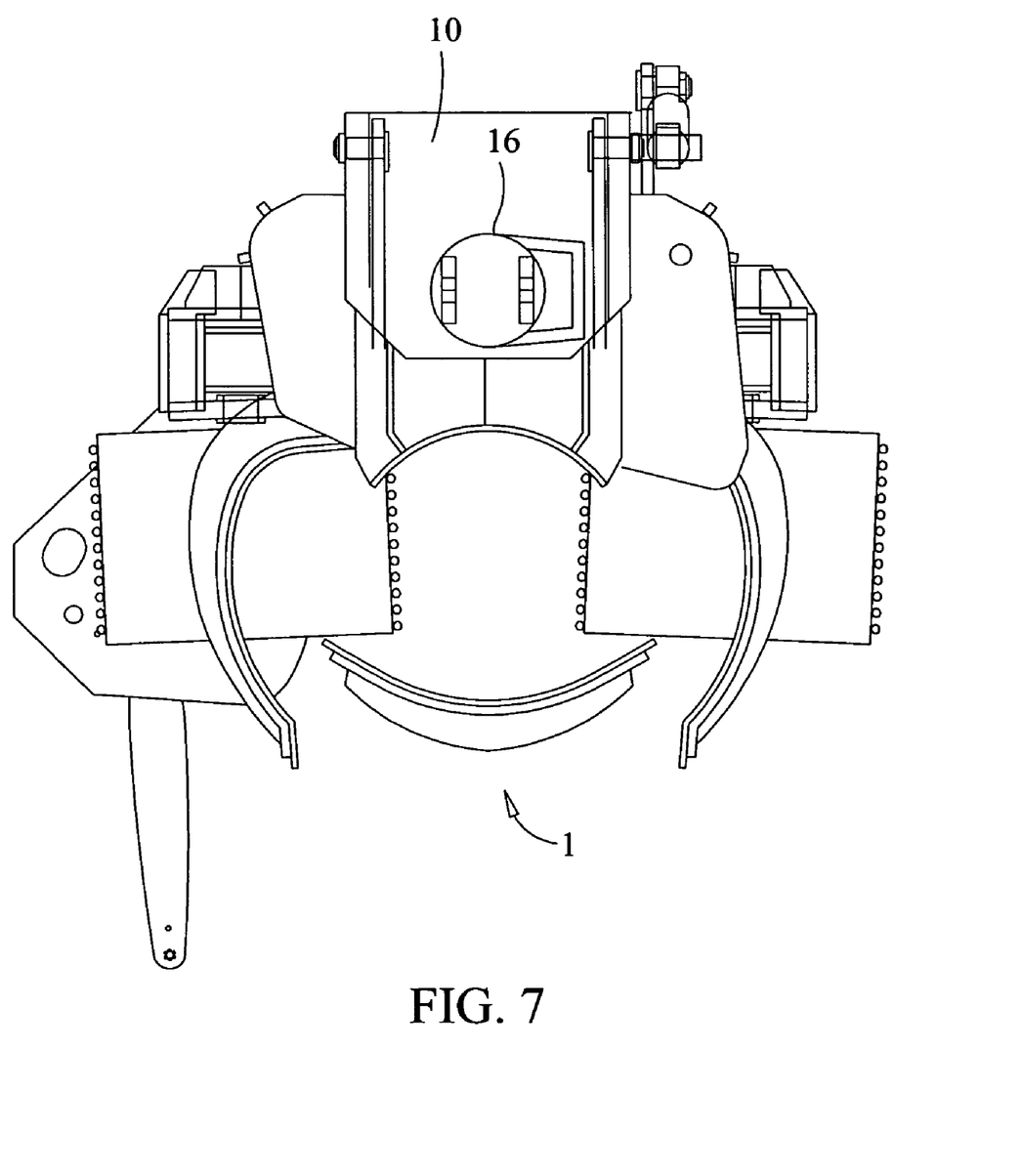
FIG. 7 is a top view of an improved tree processor.

A first pivot hole 26 and a second pivot hole 28 are formed through the actuation plate 17. Referring briefly to FIGS. 1-3, a pivot pin 30 is inserted through the actuation end 32 of the actuator 14 and the first pivot hole 26 for harvesting trees and processing trees in normal terrains or harvesting trees in mountainous terrains. The pivot pin 30 preferably includes a head 31 formed on one end and a thread formed on the other end thereof. The pivot pin 30 is axially retained by threading a nut 33 on to the other end of the pivot pin 30. However, other designs of pivot pins may also be used. Referring briefly to FIGS. 4-5, the pivot pin 30 is inserted through the actuation end 32 of the actuator 14 and the second pivot hole 28 for processing trees in mountainous terrains. The pivot pin 30 is removable from the actuation end 32 and the first or second pivot holes. However, the pivot pin 30 may be inserted through the one end of the actuator 14 instead of the actuation end 32.

With reference to FIGS. 8-13, a second embodiment of the improved tree processor 2 includes a retention bracket 34, a processing head 36 and the actuator 14. The retention bracket 34 includes a pair of bracket support plates 35. The processing head 36 includes a pair of pivot plates 37 and a pair of actuation yokes 39. The rotator 16 is attached to a top of the retention bracket 34. A bottom of the pair of bracket support plates 35 are pivotally attached to the pair of pivot plates 37 of the processing head 36 by inserting two pins 38 through two bracket bores 40 and two head bores 42. One end of the actuator 14 is pivotally attached to one of the actuation yokes 39 and an actuation end 32 of the actuator 14 is pivotally attached to one of the bracket support plates 35 of the retention bracket 34. A first pivot hole 44 and a second pivot hole 46 are formed through the pair of bracket support plates 35. However, the one end of the actuator 14 may also be pivotally attached to one of the bracket support plates 35 and the actuation end 32 pivotally attached to one of the actuation yokes 39.

Figure 8:
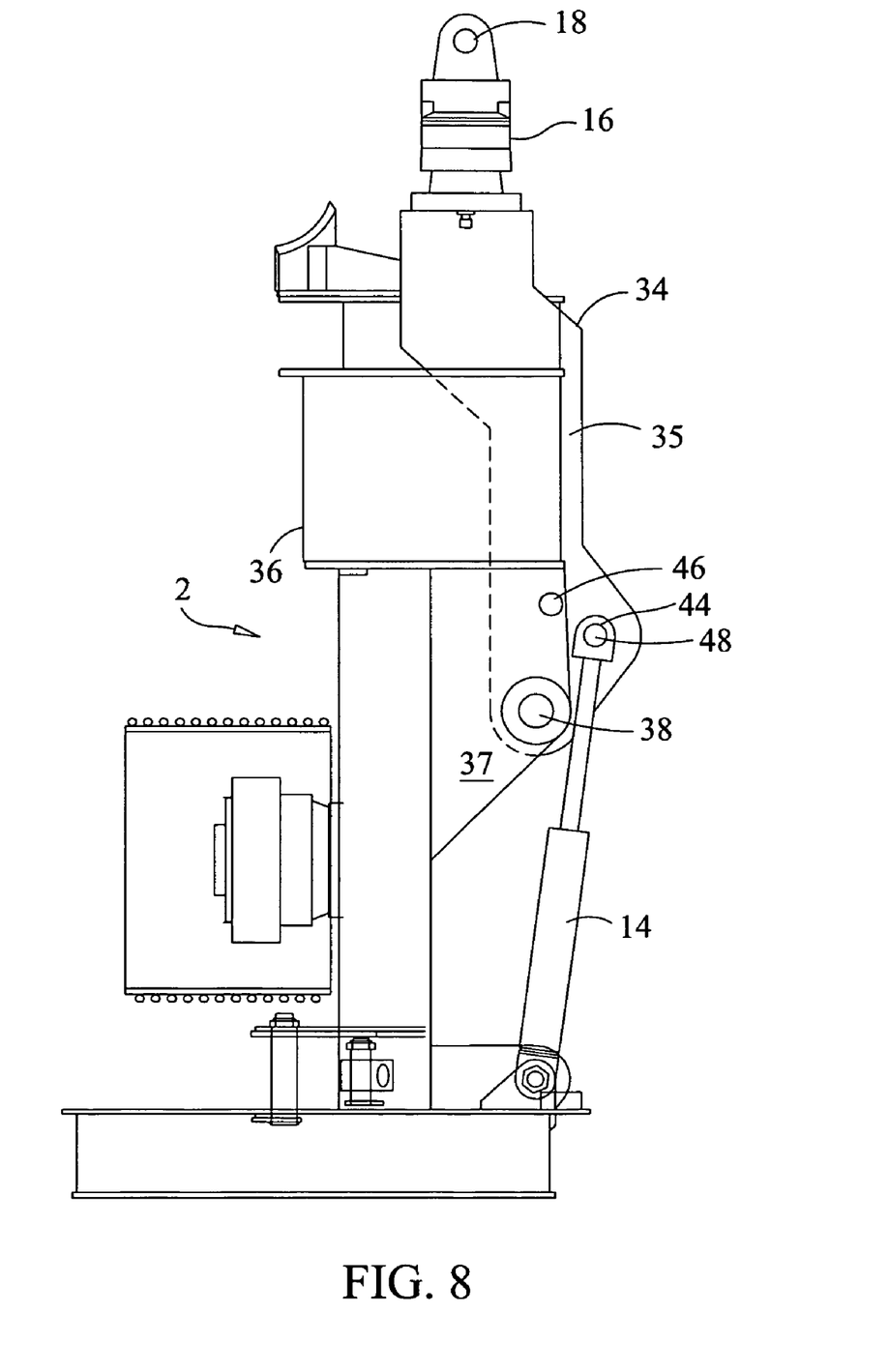
FIG. 8 is a side view of a second embodiment of an improved tree processor with a retention bracket having two pivot holes, an actuation end of an actuator is pivotally retained in a first pivot hole to place the retention bracket at a (0) degree rotation relative to a processing head.
Figure 9:
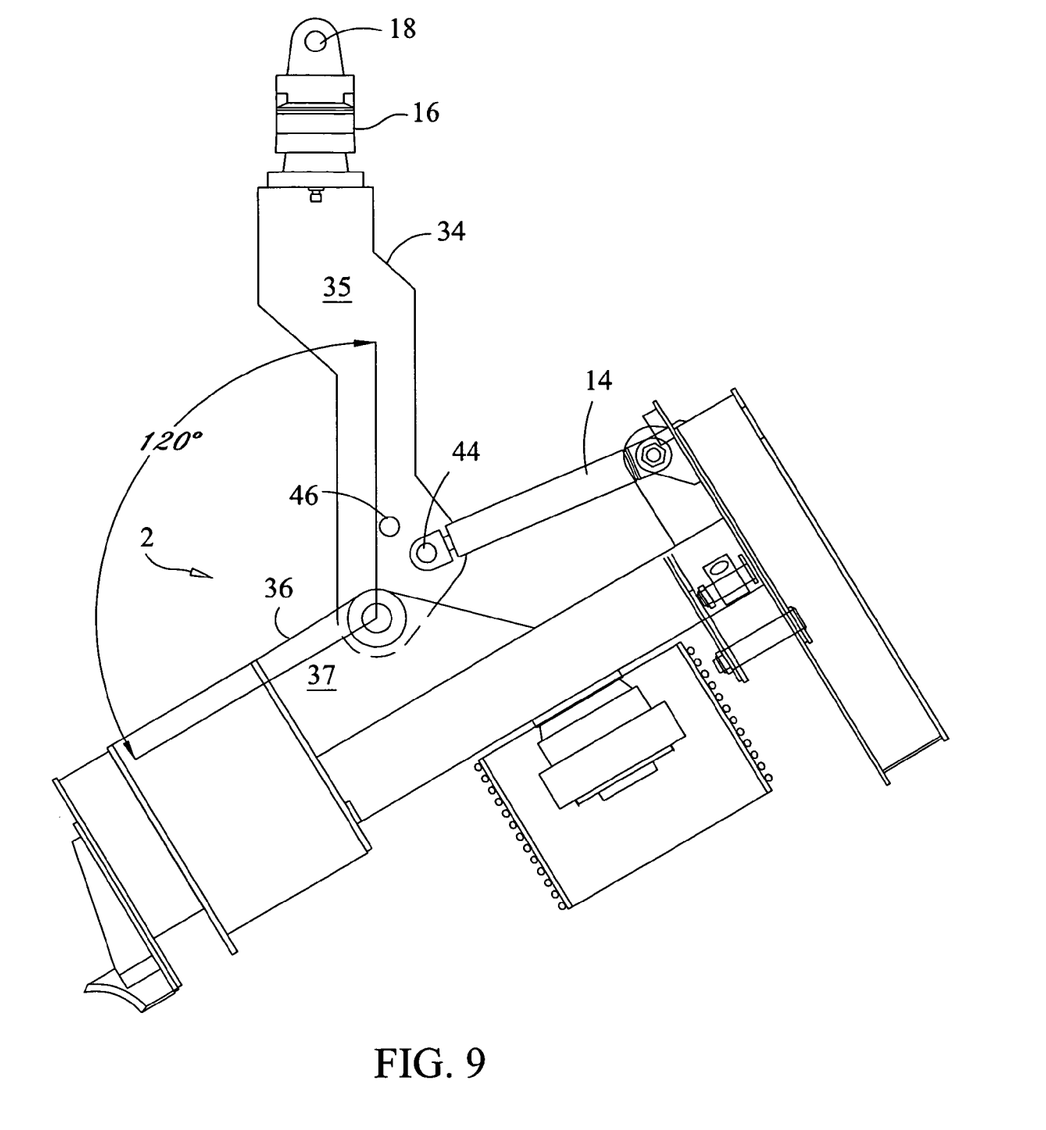
FIG. 9 is a side view of a second embodiment of an improved tree processor with a retention bracket having two pivot holes, an actuation end of an actuator is pivotally retained in a first pivot hole to place the retention bracket at a (120) degree rotation relative to a processing head.
Figure 10:
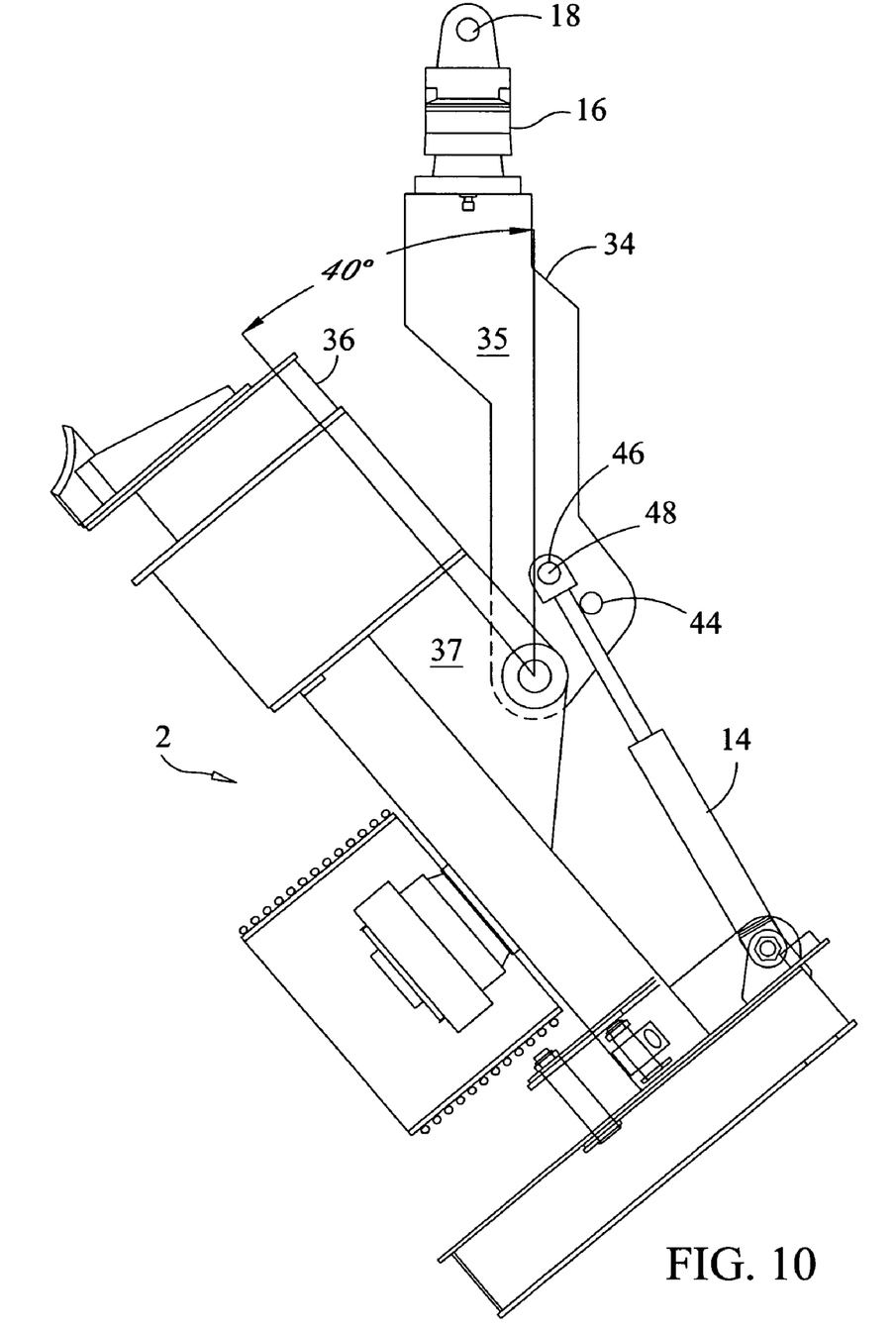
FIG. 10 is a side view of a second embodiment of an improved tree processor with a retention bracket having two pivot holes, an actuation end of an actuator is pivotally retained in a second pivot hole to place the retention bracket at a (40) degree rotation relative to a processing head.
Figure 11:
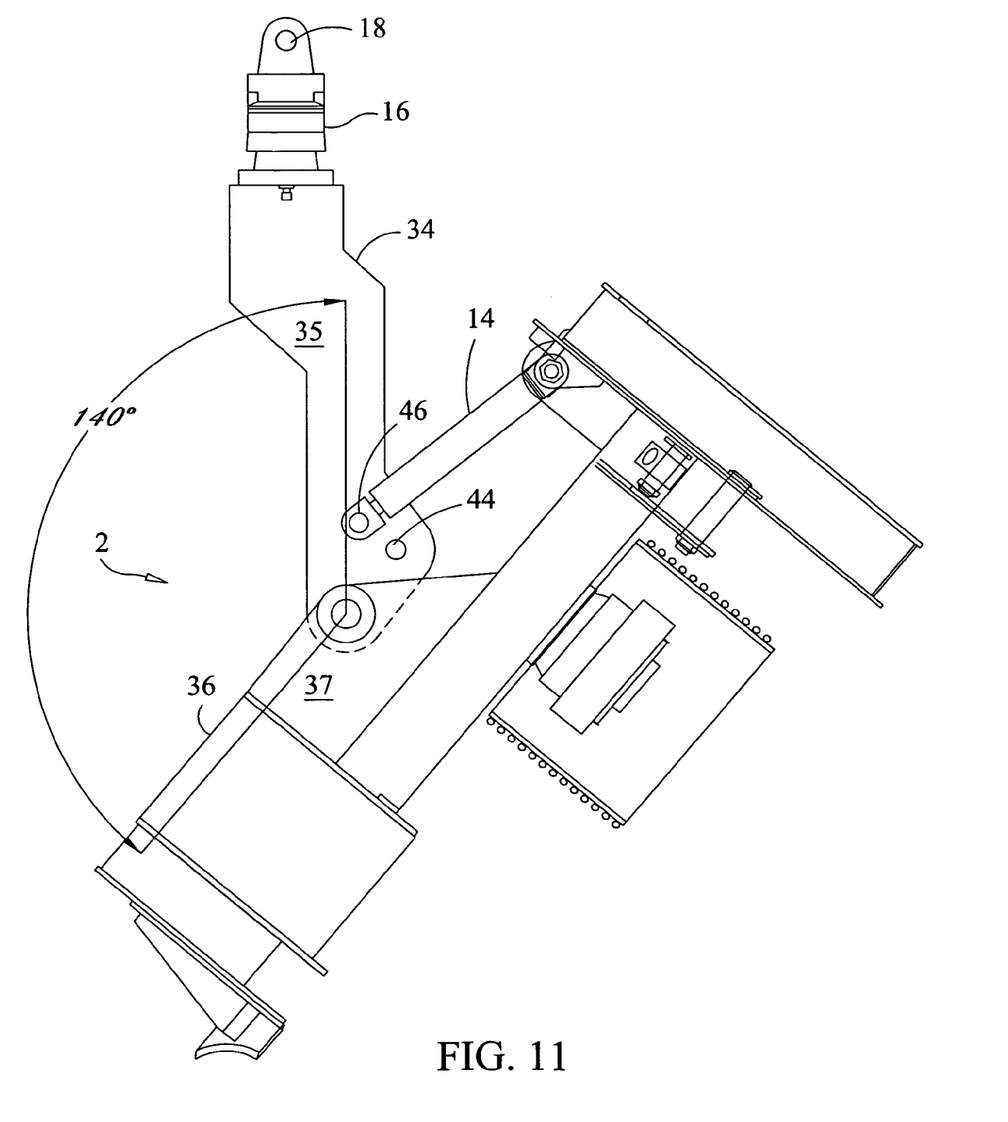
FIG. 11 is a side view of a second embodiment of an improved tree processor with a retention bracket having two pivot holes, an actuation end of an actuator is pivotally retained in a second pivot hole to place the retention bracket at a (140) degree rotation relative to a processing head.
Figure 12:
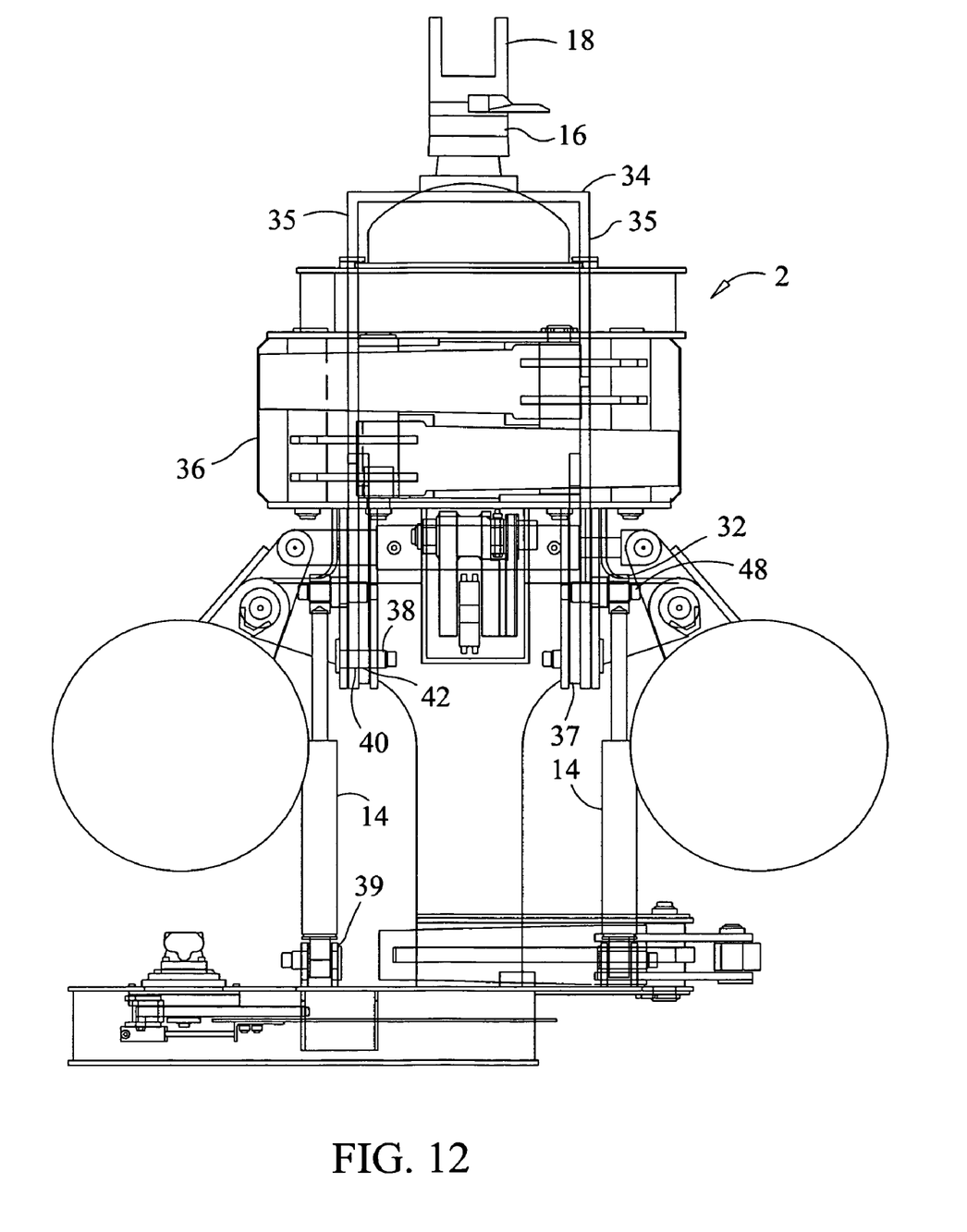
FIG. 12 is a front view of a second embodiment of an improved tree processor.
Figure 13:
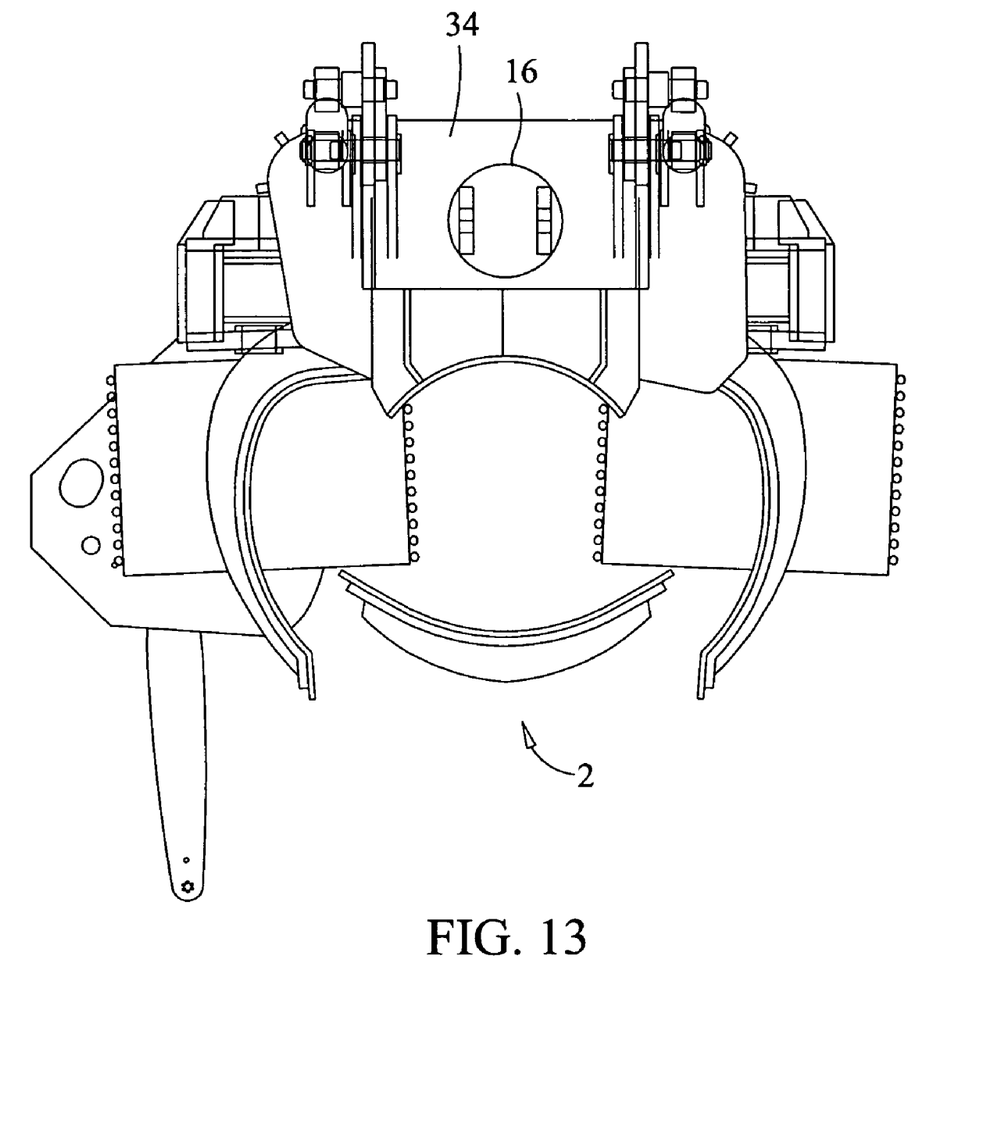
FIG. 13 is a top view of a second embodiment of an improved tree processor.

Referring briefly to FIGS. 8-9, a pivot pin 48 is inserted through the actuation end 32 of the actuator 14 and the first pivot hole 44 for harvesting trees and processing trees in normal terrains or harvesting trees in mountainous terrains. Referring briefly to FIGS. 10-11, the pivot pin 48 is inserted through the actuation end 32 of the actuator 14 and the second pivot hole 46 for processing trees in mountainous terrains. The pivot pin 48 is removable from the actuation end 32 and the first or second pivot holes. However, the pivot pin 48 may be inserted through the one end of the actuator 14 instead of the actuation end 32.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

We claim:

1. An improved tree processor having a processing head with increased angular rotation comprising:
    a processing head for processing trees;
    a retention bracket pivotally retaining said processing head, forming a first pivot hole and a second pivot hole through one of said processing head and said retention bracket, both said first and second pivot holes being formed through either one of said processing head and said retention bracket; and
    at least one actuator, attaching pivotally one end of each one of said at least one actuator to said first pivot hole or optionally to said second pivot hole, attaching pivotally the other end of each one of said at least one actuator to one of said retention bracket and said processing head.

2. The improved tree processor having a processing head with increased angular rotation of claim 1, further comprising:
    a pivot pin being removable from each one of said at least one actuator and one of said first pivot hole and said second pivot hole.

3. The improved tree processor having a processing head with increased angular rotation of claim 1, further comprising:
    said retention bracket including a pair of bracket support plates.

4. The improved tree processor having a processing head with increased angular rotation of claim 3, further comprising:
    said processing head including a pair of pivot plates, said pair of pivot plates being pivotally retained by said pair of bracket support plates.

5. The improved tree processor having a processing head with increased angular rotation of claim 3, further comprising:
    a rotator being attached to a top of said retention bracket, a top of said rotator being pivotally retained by a forestry equipment boom.

6. An improved tree processor having a processing head with increased angular rotation comprising:
    a processing head for processing trees;
    a retention bracket pivotally retaining said processing head, forming a first pivot hole and a second pivot hole through said retention bracket, both said first and second pivot holes being formed through either one of said processing head and said retention bracket; and
    at least one actuator, attaching pivotally one end of each one of said at least one actuator to said first pivot hole or optionally to said second pivot hole, attaching pivotally the other end of each one of said at least one actuator to said processing head.

7. The improved tree processor having a processing head with increased angular rotation of claim 6, further comprising:
    a pivot pin being removable from each one of said at least one actuator and one of said first pivot hole and said second pivot hole.

8. The improved tree processor having a processing head with increased angular rotation of claim 6, further comprising:

said retention bracket including a pair of bracket support plates.

9. The improved tree processor having a processing head with increased angular rotation of claim 8, further comprising:

said processing head including a pair of pivot plates, said pair of pivot plates being pivotally retained by said pair of bracket support plates.

10. The improved tree processor having a processing head with increased angular rotation of claim 8, further comprising:

a rotator being attached to a top of said retention bracket, a top of said rotator being pivotally retained by a forestry equipment boom.

* * * * *